(12) United States Patent
White, Jr. et al.

(10) Patent No.: US 6,231,068 B1
(45) Date of Patent: May 15, 2001

(54) SEAT MOUNTED AIR BAG MODULE

(75) Inventors: Michael J. White, Jr., Almont; Erik S. Koch, Macomb, both of MI (US)

(73) Assignee: TRW Vehicle Safety Systems Inc., Lyndhurst, OH (US)

(*) Notice: Subject to any disclaimer, the term of this patent is extended or adjusted under 35 U.S.C. 154(b) by 0 days.

(21) Appl. No.: 09/543,514

(22) Filed: Apr. 6, 2000

(51) Int. Cl.[7] .................................................. B60R 21/16
(52) U.S. Cl. ..................... 280/728.2; 280/730.2; 403/353
(58) Field of Search ................ 280/730.2, 728.2, 280/728.1, 730.1; 403/353, 374.1; 5/914, 710

(56) References Cited

U.S. PATENT DOCUMENTS

| | | |
|---|---|---|
| 5,533,752 | 7/1996 | Brown et al. |
| 5,542,691 | 8/1996 | Marjanski et al. |
| 5,556,129 | 9/1996 | Coman et al. |
| 5,645,295 | 7/1997 | White, Jr. et al. ............... 280/730.2 |
| 5,890,733 | 4/1999 | Dillon. |

*Primary Examiner*—Eric Culbreth
(74) *Attorney, Agent, or Firm*—Tarolli, Sundheim, Covell, Tummino & Szabo L.L.P.

(57) ABSTRACT

An apparatus (10) for helping to protect an occupant of a vehicle (14) comprises a seat (12) for the vehicle occupant. The seat (12) includes a seat frame member (20) having at least one mounting opening (60). The mounting opening (60) has an elongate configuration including a first portion (62) and a second portion (64). The apparatus (10) also comprises an air bag module (70) that has at least one mounting pin (80). The mounting pin (80) is insertable into the first portion (62) of the mounting opening (60) and is movable along the opening from the first portion to the second portion (64) of the opening. The mounting pin (80) and the seat frame member (70) have cooperating portions (92, 46, 48) that secure the mounting pin in the second portion (64) of the mounting opening (60) to secure the module (70) to the seat frame member.

10 Claims, 2 Drawing Sheets

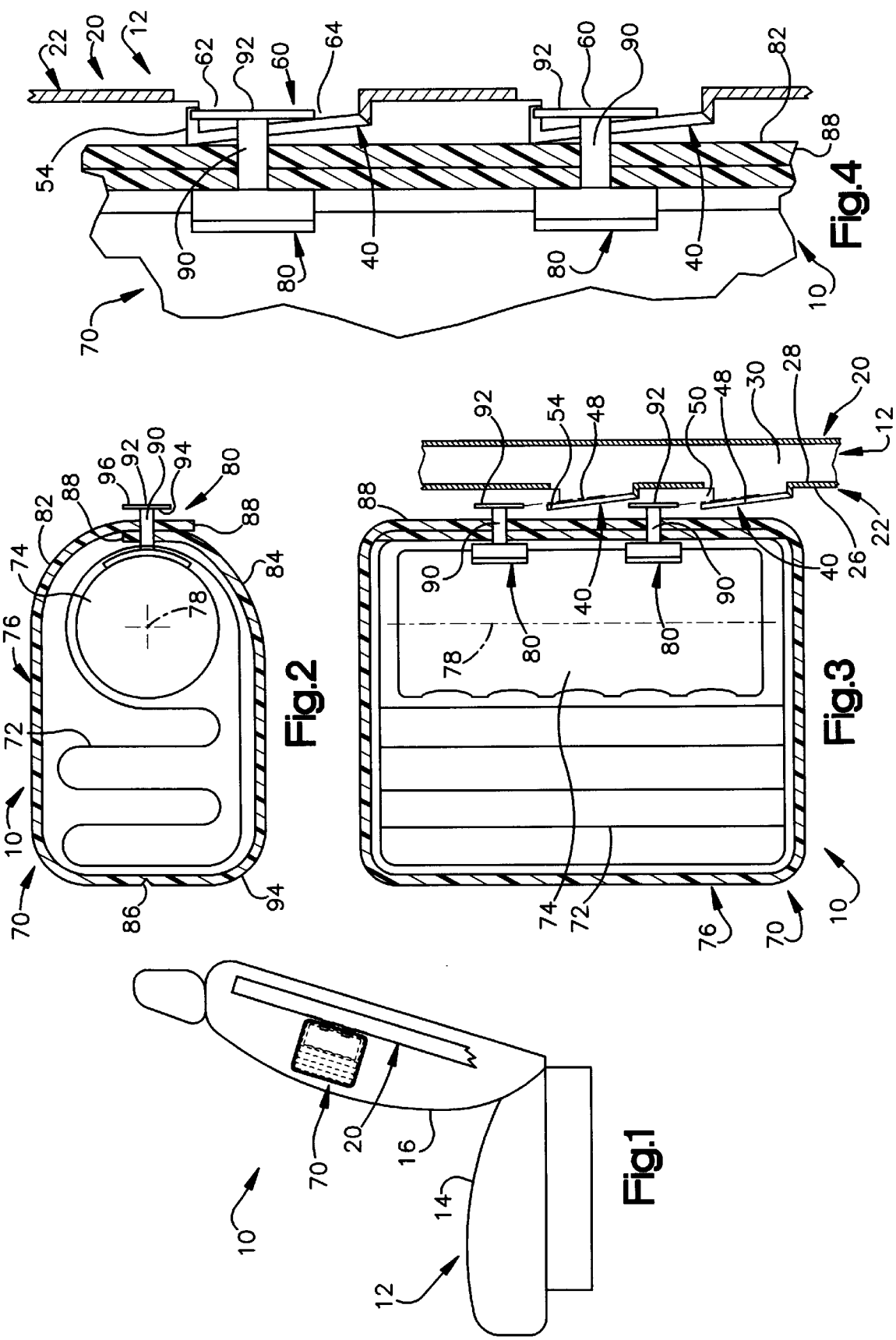

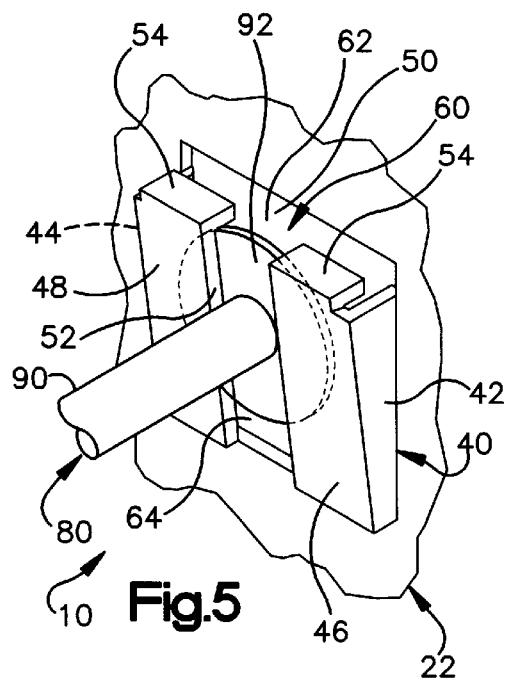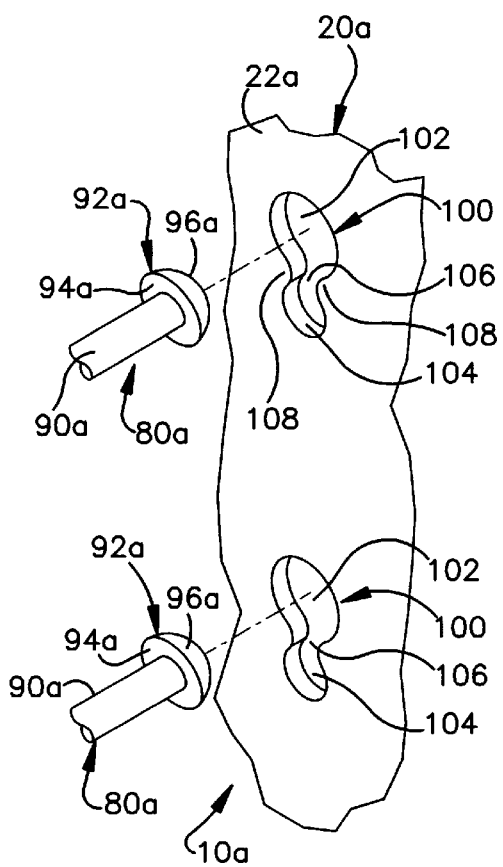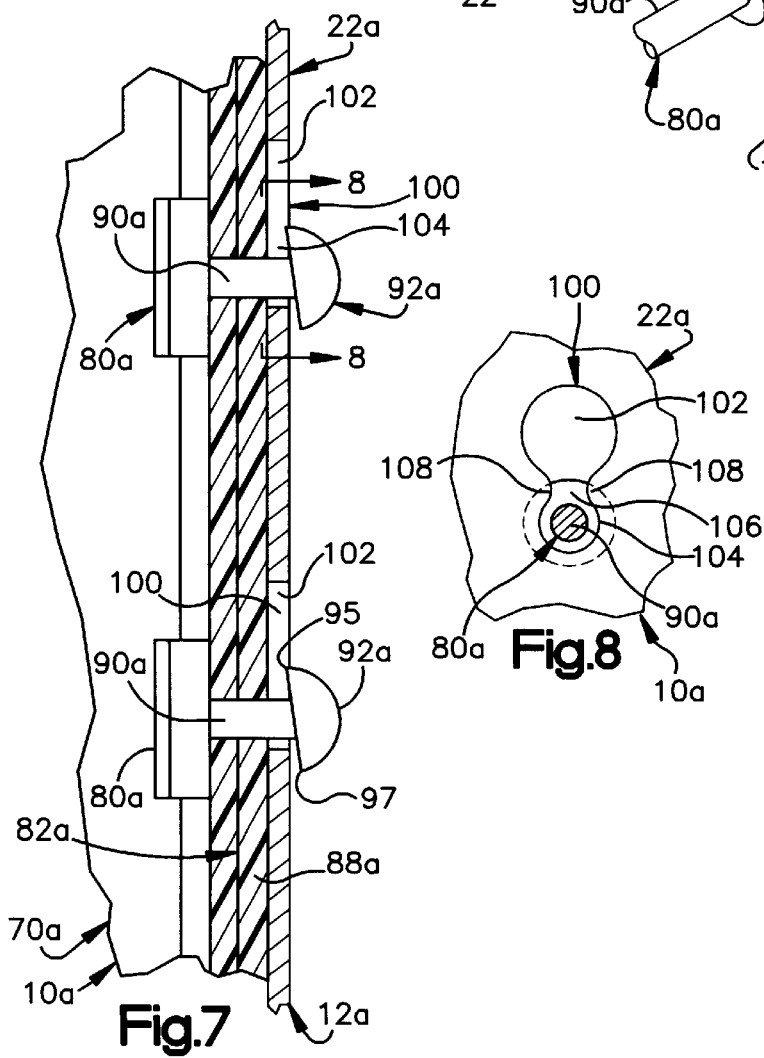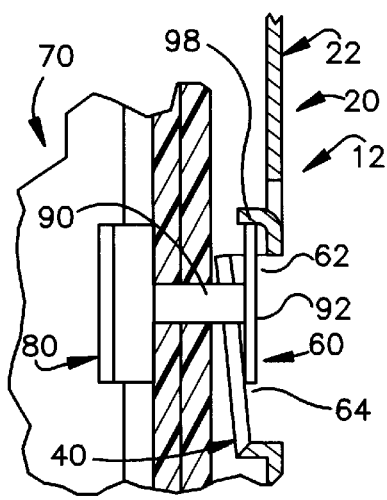

SEAT MOUNTED AIR BAG MODULE

BACKGROUND OF THE INVENTION

1. Technical Field

The present invention relates to a seat mounted air bag module and, in particular, to the mounting of an air bag module on a seat frame member of a vehicle seat.

2. Description of the Prior Art

It is known to mount a side impact air bag module on a frame member of a vehicle seat. The module is typically mounted with threaded fasteners, such as mounting studs, that extend through openings in the seat frame member. Nuts screwed onto the studs secure the module to the seat frame member. This type of assembly, although relatively easy, is time consuming and requires a number of steps during assembly of the seat.

SUMMARY OF THE INVENTION

The present invention is an apparatus for helping to protect an occupant of a vehicle, comprising a seat for the vehicle occupant. The seat includes a seat frame member having surfaces defining at least one mounting opening. The mounting opening has an elongate configuration including a first portion and a second portion. The apparatus also comprises a module including an inflatable vehicle occupant protection device, an inflator for inflating the inflatable device, and at least one mounting pin. The mounting pin is insertable into the first portion of the mounting opening and is movable along the opening from the first portion to the second portion of the opening. The mounting pin and the seat frame member have cooperating portions that secure the mounting pin in the second portion of the mounting opening to secure the module to the seat frame member.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 1 is a schematic side view of an apparatus in accordance with a first embodiment of the invention, including a vehicle seat, a seat frame member and an air bag module;

FIG. 2 is a top view, partially in section, of the air bag module of the apparatus of FIG. 1;

FIG. 3 is an elevational view, partially in section, of the air bag module and seat frame member of FIG. 1, shown in an unassembled condition;

FIG. 4 is an enlarged view of a portion of the air bag module and seat frame member, shown in an assembled condition;

FIG. 5 is an enlarged perspective view of a portion of the air bag module and seat frame member, shown in an assembled condition;

FIG. 6 is a perspective view of a portion of an apparatus in accordance with a second embodiment of the invention, shown in an unassembled condition;

FIG. 7 is a view similar to FIG. 4 showing the apparatus of FIG. 6 in an assembled condition;

FIG. 8 is a view taken along line 8—8 of FIG. 7; and,

FIG. 9 is a view similar to FIG. 4 showing an alternative embodiment of a seat frame member.

DETAILED DESCRIPTION OF EMBODIMENTS OF THE INVENTION

The present invention relates to a seat mounted air bag module and, in particular, relates to the mounting of an air bag module on a frame member of a vehicle seat. The present invention is applicable to various air bag module and seat constructions. As representative of the present invention, FIGS. 1–5 illustrate an apparatus 10 in accordance with a first embodiment of the invention.

The apparatus 10 includes a seat 12 for an occupant of a vehicle. The seat 12 includes a seat bottom cushion 14 and a seatback 16 connected with the seat bottom cushion. The seat 12 has a seat frame member 20. The seat frame member 20 is a substantially rigid structural portion of the vehicle seat 12. In the illustrated embodiment, the seat frame member 20 extends along the top to bottom extent of the seatback 16.

The seat frame member 20 has a tubular configuration including a front wall 22 (FIG. 3). The front wall 22 has an outer or forward-facing surface 26 and an opposite inner surface 28. The inner surface 28 of the seat frame member is presented toward the interior 30 of the frame member 20.

The seat frame member 20 includes a plurality of vertically spaced projecting portions or mounting brackets 40. The mounting brackets 40 extend forward (to the left as viewed in FIGS. 1–4) from the outer surface 26 of the wall 22. The mounting brackets 40 are identical to each other and so are given identical reference numerals.

Each mounting bracket 40 comprises a pair of spaced apart side walls 42 and 44 (FIG. 5) that extend forward from the front wall 22 of the seat frame member 20. Each mounting bracket 40 also comprises a pair of front bracket walls 46 and 48 that extend toward each other from the outer ends of the side walls 42 and 44, respectively. The front bracket walls 46 and 48 are spaced apart from the front wall 22 of the seat frame member 20, defining an opening 50 between the front bracket walls and the front wall of the seat frame member. Lower portions of the front bracket walls 46 and 48 are closer to the plane of the outer surface 26 of the wall 22 than are upper portions of the front walls.

The mounting bracket 40 includes a slot 52 defined between the front bracket walls 46 and 48. The slot 52 is contiguous with the opening 50. The mounting bracket 40 also includes a pair of retaining tabs 54. The retaining tabs 54 comprise the uppermost portions of the front bracket walls 46 and 48 and initially extend in the same direction as the remainder of the front bracket walls.

The slot 52 and the opening 50 together form a mounting opening 60 in the seat frame member 20. The mounting opening 60 has a vertically elongate configuration including an upper end portion or first portion 62 and a lower end portion or second portion 64.

The apparatus 10 includes an air bag module 70 that is preferably of the type described in U.S. Pat. No. 5,645,295. The air bag module 70 includes an air bag 72 (FIG. 3), an inflator 74 for providing inflation fluid to the air bag, and a cover 76 for covering the air bag and the inflator. The inflator 74 has an elongate cylindrical configuration centered on an axis 78. The inflator 74 extends generally parallel to the seat frame member 50 when the module 70 is mounted on the seat 12.

The cover 76 is made from a resilient plastic material and has a clamshell configuration including first and second cover portions 82 and 84 joined by a rupturable hinge 86. The first and second cover portions 82 and 84 have outer end portions 88 that overlie each other so that the cover portions are closed in over the inflator 74 and the air bag 72. A plurality of vertically spaced module mounting pins 80 extend from the inflator 74 through the outer end portions 88 of the cover 76. The mounting pins 80 are identical and so are given the same reference numerals.

Each mounting pin 80 has a cylindrical stem portion 90. A head portion 92 of the mounting pin 80 is located at the outer end of the stem portion 90. The head portion 92 of the mounting pin 80 has a disc-shaped configuration including parallel, circular inner and outer major side surfaces 94 and 96 that extend perpendicular to the stem portion 90. The inner side surface 94 of the head portion 92 is spaced apart by a predetermined distance from the outer end portion 88 of the first cover portion 82 of the module 70.

FIG. 3 illustrates the parts of the apparatus 10 in a condition prior to assembly. The air bag module 70 is not secured to the seat 12. The mounting pins 80 on the module 70 are located above but not in the mounting openings 60 in the seat frame member 20.

To secure the module 70 to the seat frame member 20, the module is moved relative to the seat frame member, in a downward direction as viewed in FIGS. 3–5. The mounting pins 80 on the module 70 move into the mounting openings 60 in the seat frame member 20, from the unassembled condition shown in FIG. 3 toward an assembled condition as shown in FIGS. 4 and 5.

Each mounting pin 80 moves into the upper end portion or first portion 62 of a mounting opening 60. The head portion 92 of the mounting pin 80 is located behind the front walls 46 and 48 of the associated mounting bracket 40, in the opening 50 between the front walls and the wall 22 of the seat frame member 20. The stem 90 of the mounting pin 80 is located in the upper end portion of the slot 52 between the front bracket walls 46 and 48.

The mounting pin 80 is then moved farther in a downward direction as viewed in FIGS. 3–5, along the mounting opening 60, from the first portion 62 of the mounting opening to the second portion 64 of the mounting opening. The stem portion 90 of the mounting pin 80 moves along the slot 52 and the head portion 92 of the mounting pin moves farther into the opening 50 behind the front bracket walls 46 and 48.

As the mounting pin 80 moves into the second portion 64 of the mounting opening 60, the inner side surface 94 of the head portion 92 of the pin engages the front walls 46 and 48 of the mounting bracket 40. Because the front bracket walls 46 and 48 extend at an angle to the front wall 22 of the seat frame member 20, this engagement causes the mounting pin 80, and the module 70 as a whole, to be drawn laterally inward toward the seat frame wall 22. This lateral movement of the module 70 continues as the module moves downward along the seat frame member 20, until the outer end portion 88 of the first cover portion 82 of the module 70 engages the front bracket walls 46 and 48 of the mounting bracket, on the side of the front bracket walls opposite the frame member wall 22. This engagement precludes further movement of the pin 80 along the mounting opening 60 because of the fixed distance between the inner side surface 94 of the head portion 92 of the mounting pin 80 and the end portion 88 of the first cover portion 82 of the module 70. The mounting pins 80 of the module 70 are thus "bottomed out" in the mounting brackets 40 of the seat frame member 20.

The retaining tabs 54 are, thereafter, bent over to the position shown in FIGS. 4 and 5 to engage the head portion 92 of the pin 80. This engagement secures the pin 80 in position against the front bracket walls 46 and 48, in the second portion 64 of the mounting opening 60, and prevents the module 70 from moving upward and disengaging from the seat frame member 20. Thus, the module 70 is secured in position on the seat frame member 20.

Instead of the tabs 54, the seat frame member 20 (FIG. 9) alternatively could include retaining tabs as shown at 98 on the frame member wall 22. The tabs 98 are bendable forward (to the left as viewed in FIG. 9) and downward from the wall 22 to contact the heads 92 of the mounting pins 90, to prevent the module 70 from moving upward and disengaging from the seat frame member 20.

FIGS. 6–8 illustrate portions of an apparatus 10*a* in accordance with a second embodiment of the invention. The apparatus 10*a* is similar in construction and operation to the apparatus 10 (FIGS. 1–5), and corresponding parts are given the same reference numerals with the suffix "a" added for clarity.

The apparatus 10*a* includes an side impact air bag module 70*a* that is similar to the module 70 (FIGS. 1–5). The module 70*a* includes two mounting pins 80*a*. Each mounting pin 80*a* includes a cylindrical stem portion 90*a*. A head portion 92*a* of the mounting pin 80*a* is located at an outer end of the stem portion 90*a*. The head portion 92*a* of the mounting pin 80*a* has a hemispherical configuration including an annular inner side surface 94*a* and a hemispherical outer side surface 96*a*. The inner side surface 94*a* of the head portion 92*a* is spaced apart by a predetermined distance from the outer end portion 88*a* of the first cover portion 82*a* of the module 70*a*. The head portion 92*a* does not extend perpendicular to the stem portion 90*a* but instead is angled relative to the stem portion as best seen in FIG. 7. As a result, the upper edge 95 of the head portion 92*a* is closer to the end portion 88*a* of the cover portion 80*a* than is the lower edge 97 of the head portion.

The apparatus 10*a* includes a seat frame member 20*a* that is similar to the seat frame member 20. The seat frame member 20*a* includes a front wall 22*a* that has a pair of slots 100 for receiving the mounting pins 80*a* on the module 70*a*. Each slot 100 has a figure-eight configuration including a generally circular upper portion 102 and a generally circular lower portion 104. The upper portion 102 is larger in diameter than the lower portion 104. A narrow neck portion 106 of the slot 100 is disposed between the upper portion 102 and the lower portion 104. The neck portion 106 of the slot opening 100 is located between two spaced apart projecting portions 108 on the seat frame member 20*a*.

FIG. 6 illustrates the parts of the apparatus 10*a* in an unassembled condition. The mounting pins 80*a* on the module 70*a* are spaced apart laterally from the slots 100 in the seat frame member 20*a*. The air bag module 70*a* is not secured to the seat 12*a*.

To secure the module 70*a* to the seat frame member 20*a*, the module is moved relative to the seat frame member, in a left to right direction as viewed in FIGS. 6–7. The mounting pins 80*a* on the module 70*a* move into the upper portions 102 of the slots 100 in the seat frame member 20. After the head portions 92*a* of the pins 80*a* are located behind the front wall 22*a* of the seat frame member 20*a*, the mounting pins are moved in a downward direction as viewed in FIGS. 6–8, along the seat frame member, from the upper portions 102 of the slots 100 to the lower portions 104 of the slots.

As the stem portion 90*a* of each mounting pin 80*a* moves vertically downward along its respective slot 100, the stem portion engages the projecting portions 108 of the seat frame member 22a on opposite sides of the neck portion 106 of the slot. The distance between the projecting portions 108 is selected to be a distance that requires the mounting pin 80a to be forced through the neck portion 106 of the slot 100 into the lower portion 104 of the slot.

When the mounting pin 80a then moves into the lower portion 104 of the slot 100, the upper edge 95 of the head portion 92a of the pin engages the inner side surface of the front wall 22a of the seat frame member 20a, on the projecting portions 108 of the seat frame member. Because the inner side surface 94a of the head portion 92a of the pin 80a extends at an angle to the front wall 22a of the seat frame member 20a, the upper edge 95 of the head portion 92a of the pin digs into the seat frame member to prevent movement of the pin upward along the slot 100 in the seat frame member 20a. (This positioning is shown exaggerated in FIG. 7.) The engagement of the mounting pins 80a with the seat frame member 20a secures the module 70a in position on the seat 12a.

From the above description of the invention, those skilled in the art will perceive improvements, changes and modifications in the invention. Such improvements, changes and modifications within the skill of the art are intended to be covered by the appended claims.

Having described the invention, we claim:

1. An apparatus for helping to protect an occupant of a vehicle, comprising:
    a seat for the vehicle occupant, said seat including a seat frame member having at least one mounting opening, said one mounting opening having an elongate, slot configuration including a first portion and a second portion;
    a module including an inflatable vehicle occupant protection device, an inflator for inflating said inflatable device, and at least one mounting pin;
    said one mounting pin being insertable into said first portion of said one mounting opening and being movable in a first direction along said one mounting opening from said first portion to said second portion of said one mounting opening;
    said mounting pin and said seat frame member having cooperating portions which secure said mounting pin in said second portion of said one mounting opening to secure said module to said seat frame member.

2. An apparatus as set forth in claim 1 wherein said one mounting pin has a stem portion and a head portion.

3. An apparatus as set forth in claim 1 wherein said one mounting opening has a figure eight configuration including a relatively narrow neck portion disposed between relatively wide first and second end portions.

4. An apparatus as set forth in claim 1 wherein said cooperating portions of said one mounting pin and said seat frame member do not extend parallel to each other.

5. An apparatus as set forth in claim 1 wherein movement of said module along said seat frame member in said first direction produces movement of said module relative to said seat frame member in a direction transverse to said first direction.

6. An apparatus as set forth in claim 1 wherein:
    said seat frame member has a plurality of mounting openings each having an elongate configuration including a first portion and a second portion;
    said module includes a plurality of mounting pins, each one of said mounting pins being insertable into a first portion of a respective one of said mounting openings and being movable in a first direction along said opening from said first portion to said second portion of said opening; and
    said mounting pins and said seat frame member have cooperating portions that secure said mounting pins in said second portions of said mounting openings to secure said module to said seat frame member.

7. An apparatus as set forth in claim 6 wherein each one of said mounting pins has a stem portion and a head portion.

8. An apparatus as set forth in claim 7 wherein each one of said mounting openings comprises a slot in said seat frame member and said stem portions of said mounting pins extend through said slots.

9. An apparatus as set forth in claim 6 wherein said seat frame member has a base portion and a plurality of projecting mounting brackets, each one of said mounting openings being associated with a respective one of said mounting brackets.

10. An apparatus for helping to protect an occupant of a vehicle, comprising:
    a seat for the vehicle occupant, said seat including a seat frame member having at least one mounting opening, said one mounting opening having an elongate configuration including a first portion and a second portion; and
    a module including an inflatable vehicle occupant protection device, an inflator for inflating said inflatable device, and at least one mounting pin;
    movement of said module along said seat frame member in said first direction producing movement of said module relative to said seat frame member in a second direction, said second direction being transverse to said first direction,
    said one mounting pin being insertable into said first portion of said one mounting opening and being movable in a first direction along said one mounting opening from said first portion to said second portion of said one mounting opening;
    said mounting pin and said seat frame member having cooperating portions which secure said mounting pin in said second portion of said one mounting opening to secure said module to said seat frame member.

* * * * *